US010029626B2

United States Patent
Hirose et al.

(10) Patent No.: US 10,029,626 B2
(45) Date of Patent: Jul. 24, 2018

(54) VEHICULAR INTERIOR PANEL

(71) Applicant: TOYODA IRON WORKS CO., LTD., Toyota-shi, Aichi (JP)

(72) Inventors: Masamori Hirose, Toyota (JP); Kenji Onuma, Toyota (JP); Kenichi Uemori, Nagoya (JP); Shintaro Suga, Nagoya (JP)

(73) Assignee: TOYODA IRON WORKS CO., LTD., Toyota-shi (JP)

( * ) Notice: Subject to any disclaimer, the term of this patent is extended or adjusted under 35 U.S.C. 154(b) by 0 days.

(21) Appl. No.: 15/532,217

(22) PCT Filed: Nov. 24, 2015

(86) PCT No.: PCT/JP2015/082962
§ 371 (c)(1),
(2) Date: Jun. 1, 2017

(87) PCT Pub. No.: WO2016/088606
PCT Pub. Date: Jun. 9, 2016

(65) Prior Publication Data
US 2017/0267189 A1    Sep. 21, 2017

(30) Foreign Application Priority Data
Dec. 5, 2014 (JP) ................................ 2014-247472

(51) Int. Cl.
*B60R 13/02* (2006.01)
(52) U.S. Cl.
CPC .... *B60R 13/0243* (2013.01); *B32B 2605/003* (2013.01); *B60R 2013/0287* (2013.01)
(58) Field of Classification Search
CPC ... B60R 13/02; B60R 2013/0243; B32B 3/04; B32B 7/045; B32B 7/04; B32B 7/08; B32B 2605/003
(Continued)

(56) References Cited

U.S. PATENT DOCUMENTS

| 5,181,759 A * | 1/1993 | Doolittle | B60N 2/466 296/153 |
| 6,837,544 B2 * | 1/2005 | Bornchen | B60N 2/4626 296/1.09 |

(Continued)

FOREIGN PATENT DOCUMENTS

| EP | 1712429 A2 | 10/2006 |
| JP | 02-011218 U | 1/1990 |

(Continued)

OTHER PUBLICATIONS

Jan. 19, 2016 International Search Report issued with International Patent Application No. PCT/JP2015/082962.
(Continued)

*Primary Examiner* — Gregory A Blankenship
(74) *Attorney, Agent, or Firm* — Oliff PLC

(57) ABSTRACT

A vehicle interior panel in which a surface layer member including an upholstery portion and a cushioning portion covers a front surface of a base material such that the upholstery portion faces an interior side of a vehicle, in the vehicle interior panel, a terminal portion of the base material includes in an inward flange portion projecting toward the interior side of the vehicle, and the upholstery portion includes a fold-back terminal portion that is formed by folding back a terminal portion of the upholstery portion toward an exterior side of the vehicle so as to tuck in the terminal portion of the upholstery portion around the terminal portion of the base material which includes the inward flange portion, and the vehicle interior panel is configured to have a clearance between a terminal of the inward flange portion and the upholstery portion.

3 Claims, 4 Drawing Sheets

(58) Field of Classification Search
USPC .................................................. 296/146.7
See application file for complete search history.

(56) References Cited

U.S. PATENT DOCUMENTS

| | | | | |
|---|---|---|---|---|
| 9,802,383 | B2* | 10/2017 | Miyashita | B32B 3/30 |
| 2006/0220414 | A1* | 10/2006 | Boyer | B60R 13/02 |
| | | | | 296/146.7 |
| 2007/0108830 | A1* | 5/2007 | Hessler | B60N 2/4235 |
| | | | | 297/411.21 |
| 2007/0278809 | A1* | 12/2007 | Reed | B29C 53/06 |
| | | | | 296/1.08 |
| 2010/0264680 | A1* | 10/2010 | Ishikawa | B60N 2/46 |
| | | | | 296/1.09 |
| 2014/0132030 | A1 | 5/2014 | Usami et al. | |
| 2015/0048647 | A1* | 2/2015 | Kurosaki | B60R 13/02 |
| | | | | 296/146.7 |
| 2015/0072105 | A1* | 3/2015 | Miyashita | B60R 13/02 |
| | | | | 428/118 |
| 2015/0290904 | A1 | 10/2015 | Miyashita et al. | |
| 2016/0207277 | A1* | 7/2016 | Miyashita | B32B 3/30 |
| 2017/0021779 | A1 | 1/2017 | Yoshida et al. | |
| 2017/0122396 | A1* | 5/2017 | Miyashita | B32B 3/30 |

FOREIGN PATENT DOCUMENTS

| | | |
|---|---|---|
| JP | H08-156596 A | 6/1996 |
| JP | 2003-103676 A | 4/2003 |
| JP | 2004-167743 A | 6/2004 |
| JP | 2005-119404 A | 5/2005 |
| JP | 2006-213134 A | 8/2006 |
| JP | 2009-298383 A | 12/2009 |
| JP | 2012-096690 A | 5/2012 |
| JP | 2014-097722 A | 5/2014 |
| JP | 2014-104658 A | 6/2014 |
| JP | 2014-111347 A | 6/2014 |
| JP | 2014-125122 A | 7/2014 |
| JP | 2015-116985 A | 6/2015 |
| JP | 2016-128300 A | 7/2016 |
| WO | 2015/037144 A1 | 3/2015 |
| WO | 2015/151322 A1 | 10/2015 |
| WO | 2015/182403 A1 | 12/2015 |
| WO | 2016/084813 A1 | 6/2016 |
| WO | 2016/111094 A1 | 7/2016 |

OTHER PUBLICATIONS

May 25, 2017 U.S. Appl. No. 15/529,710.
Jan. 19, 2016 Search Report issued in International Patent Application No. PCT/JP2015/082961.
Feb. 23, 2016 Search Report issued in International Patent Application No. PCT/JP2015/082960.
Feb. 23, 2016 Written Opinion issued in International Patent Application No. PCT/JP2015/082960.
Jan. 19, 2016 Written Opinion issued in International Patent Application No. PCT/JP2015/082961.
Jan. 19, 2016 Written Opinion issued in International Patent Application No. PCT/JP2015/082962.
Nov. 14, 2017 Office Action issued in Japanese Patent Application No. 2014-247472.
Dec. 5, 2017 Office Action issued in Japanese Patent Application No. 2014-247471.
Dec. 5, 2017 Office Action issued in Japanese Patent Application No. 2015-003477.
Mar. 20, 2018 Office Action issued in Japanese Patent Application No. 2014-247472.
Extended European Search Report issued in European Patent Application No. 15864750.3.

* cited by examiner

VEHICULAR INTERIOR PANEL

TECHNICAL FIELD

The present invention relates to vehicle interior panels, and particularly to an improvement made to improve a tactile feel of a terminal portion of a product while ensuring desired design.

BACKGROUND ART

Vehicle interior panels are known in which a surface layer member including an upholstery portion and a cushioning portion covers the front surface of a base material such that the upholstery portion faces the interior side of a vehicle. A technique of improving a tactile feel of a product is proposed for such vehicle interior panels. One example is a vehicle interior panel described in Patent Document 1. According to this technique, an intermediate member having a cushioning layer is disposed partially between a base material and an upholstery material, and the base material has a recessed portion that accommodates the ends of the intermediate member. This can improve a tactile feel of a part of the interior panel while ensuring desired design.

RELATED ART DOCUMENTS

Patent Documents

Patent Document 1: Japanese Patent Application Publication No. 2014-111347

SUMMARY OF THE INVENTION

Problem to be Solved by the Invention

In the conventional technique, however, the base material has a smaller thickness in the recessed portion accommodating the intermediate member. This may cause problems such as reduced strength and defective molding due to the difference in thickness. Moreover, the cushioning layer may be crushed by a fold-back terminal portion of the upholstery material, which may degrade design. The inventors discovered these problems while continuing intensive studies with the intention to improve performance of vehicle interior panels.

The present invention was developed in view of the above circumstances and it is an object of the present invention to provide a vehicle interior panel that improves a tactile feel of a terminal portion of a product while ensuring desired design.

Solution to Problem

To achieve the above object, a first aspect of the invention provides a vehicle interior panel in which a surface layer member including an upholstery portion and a cushioning portion covers a front surface of a base material such that the upholstery portion faces an interior side of a vehicle, characterized in that a terminal portion of the base material includes an inward flange portion projecting toward the interior side of the vehicle, the upholstery portion includes a fold-back terminal portion that is formed by folding back a terminal portion of the upholstery portion toward an exterior side of the vehicle so as to tuck in the terminal portion of the upholstery portion around the terminal portion of the base material which includes the inward flange portion, and the vehicle interior panel has a clearance between a terminal of the inward flange portion and the upholstery portion.

Advantageous Effects of the Invention

According to the first aspect of the invention, the terminal portion of the base material includes the inward flange portion projecting toward the interior side of the vehicle, and the upholstery portion includes the fold-back terminal portion that is formed by folding back the terminal portion of the upholstery portion toward the exterior side of the vehicle so as to tuck in the terminal portion of the upholstery portion around the terminal portion of the base material which includes the inward flange portion. The vehicle interior panel has the clearance between the terminal of the inward flange portion and the upholstery portion. Accordingly, the cushioning portion can be prevented in a preferable manner from being crushed by the fold-back terminal portion of the upholstery portion. This can ensure a soft tactile feel of a terminal portion of a product and can restrain problems such as reduced strength and defective molding due to the difference in thickness. That is, the vehicle interior panel can be provided which achieve an improved tactile feel of a terminal portion of a product while ensuring desired design.

A second aspect of the invention provides the vehicle interior panel recited in the first aspect of the invention, wherein the cushioning portion is an elastic projection projecting from the upholstery portion toward the base material. Accordingly, forming the cushioning portion integrally with the upholstery portion can reduce the material cost and can thus achieve cost reduction.

MODES FOR CARRYING OUT THE INVENTION

Preferred embodiments of the present invention will be described in detail below with reference to the accompanying drawings. In the figures used in the following description, each part is not necessarily drawn at an accurate dimensional ratio etc.

First Embodiment

Figure 1:
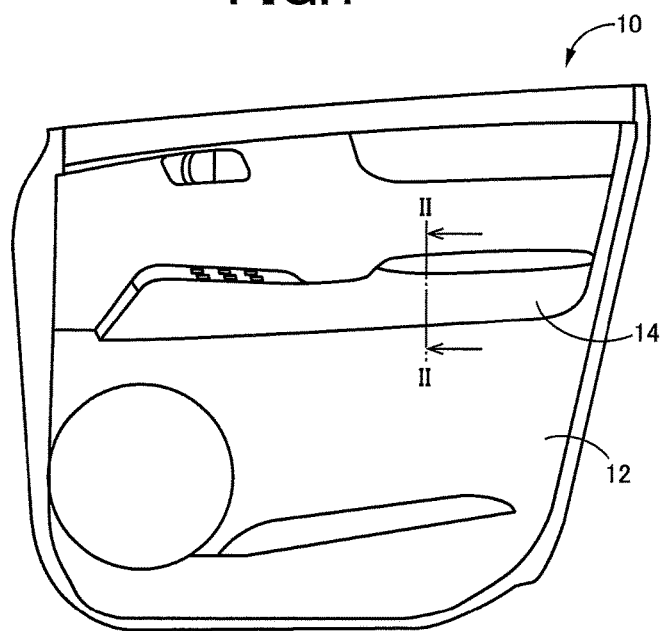
FIG. 1 is a schematic front view showing the configuration of a vehicle door including a vehicle interior panel according to a preferred embodiment of the present invention.

FIG. 1 is a schematic front view showing the configuration of a vehicle door including a vehicle interior panel 14 (hereinafter simply referred to as the panel 14) according to a preferred embodiment of the present invention, as viewed from the design surface side of the vehicle interior panel 14, namely as viewed from the passenger compartment side (interior side) of a vehicle. As shown in FIG. 1, the panel 14 of the present embodiment is a member that is attached to an inner panel of an automobile door 10, namely to a door inner plate 12, and corresponds to a part of a vehicle door trim that is disposed on the design surface side of the door 10. That is, the present embodiment is described with respect to an example in which the present invention is applied to a vehicle door trim that is attached to a door inner plate. However, the vehicle interior panel of the present invention is also applied in a preferable manner to, e.g., vehicle interior parts such as a luggage side trim, an instrument panel, and an armrest, ornaments that are attached to such interior parts, etc.

Figure 2:
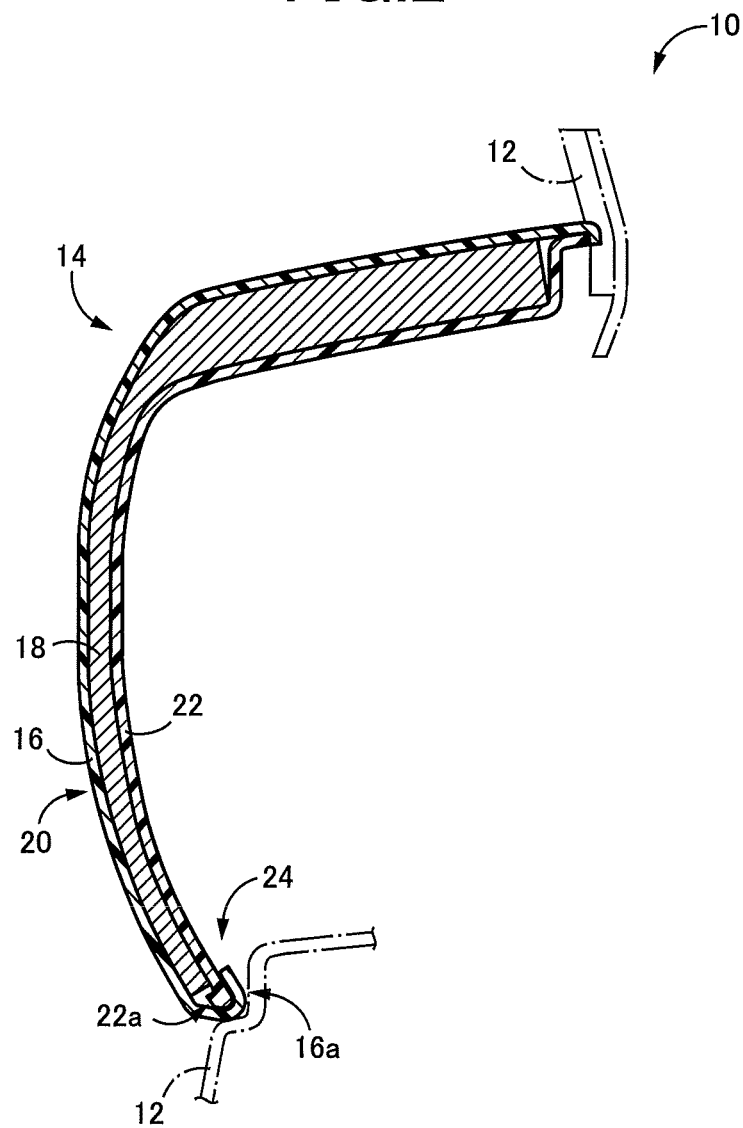
FIG. 2 is a sectional view taken along line II-II and viewed in the direction of arrow II-II in FIG. 1.
Figure 3:
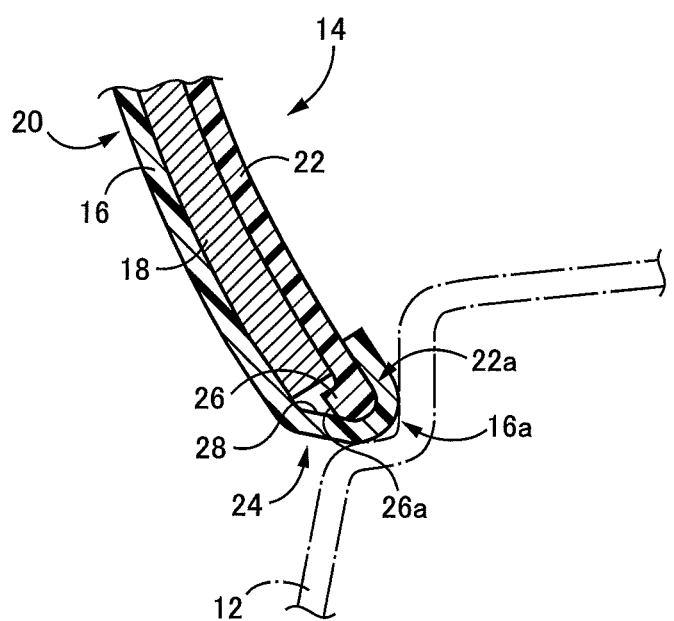
FIG. 3 is an enlarged partial sectional view of a region around a terminal portion of the vehicle interior panel in FIG. 2 which is located on the lower side of the vehicle.
Figure 4:
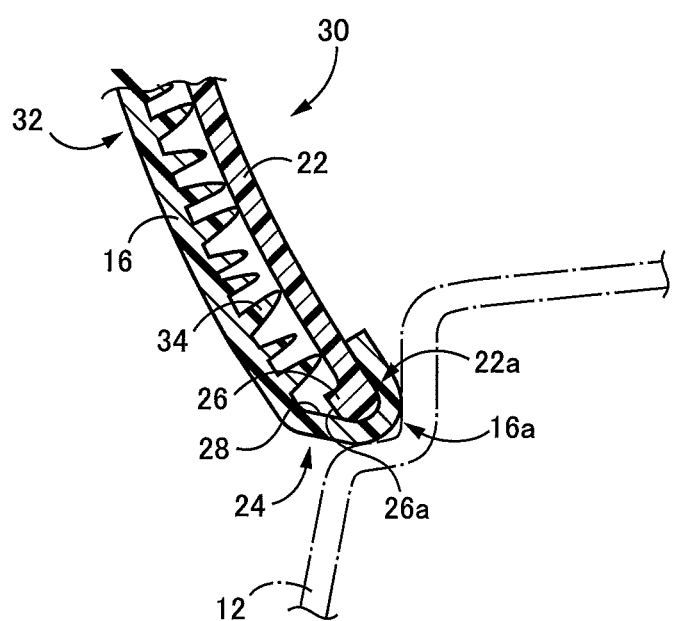
FIG. 4 is an enlarged sectional view of a region around a terminal portion of a vehicle interior panel according to another preferred embodiment of the present invention which is located on the lower side of a vehicle.

FIG. 2 is a partial sectional view taken along line II-II and viewed in the direction of arrow II-II in FIG. 1, showing in detail the configuration around the panel 14. In FIGS. 2 to 4, the door inner plate 12 (the portion other than the panel 14) is shown by alternate long and short dash lines. As shown in FIG. 2, the panel 14 includes an upholstery material 16, a cushioning material 18, and a base material 22, each being a plate-shaped member curved three-dimensionally into a three-dimensional shape. A surface layer member 20, which is a laminate of the upholstery material 16 and the cushioning material 18, covers the front surface (surface on the interior side of the vehicle) of the base material 22 such that the upholstery material 16 faces the interior side (passenger compartment side) of the vehicle. In other words, the surface layer member 20 having the upholstery material 16 on the front side and the cushioning material 18 on the back side is bonded to the front surface of the base material 22 such that the upholstery material 16 faces the interior side of the vehicle. Alternatively, the surface layer member 20 may be fixed to the base material 22 by fitting a terminal portion of the surface layer member 20 on the base material 22. The base material 22 may have a boss etc. on its back surface (on the opposite design surface side), and the surface layer member 20 may be fixed to the base material 22 by engaging the surface layer member 20 with the boss etc. In the panel 14, the upholstery material 16 corresponds to the upholstery portion and the cushioning material 18 corresponds to the cushioning portion.

For example, the upholstery material 16 is made of any of various thermoplastic resin materials such as soft polyvinyl chloride, styrene thermoplastic resin materials, olefin thermoplastic resin materials, and polyester thermoplastic resin materials. Alternatively, the upholstery material 16 may be made of any of various upholstery materials such as woven or nonwoven fabric, knitted fabric, vinyl chloride, soft films, and natural materials including wool and cowhide. For example, the cushioning material 18 is made of a synthetic resin material such as a polypropylene resin or a urethane resin so as to have predetermined elasticity, namely such cushioning properties that the cushioning material 18 is elastically deformed when pressed. Preferred examples of the synthetic resin material include urethane foam and sponge rubber. For example, the base material 22 is made of a relatively hard synthetic resin material such as a polypropylene resin, rigid polyvinyl chloride, an ABS resin, or an AS resin. The base material 22 may be made of a wood material, a metal material, etc.

The panel 14 includes a terminal portion structure 24 in which a fold-back terminal portion 16a of the upholstery material 16 is tucked in around a terminal portion 22a of the base material 22. FIG. 3 is an enlarged partial sectional view of a region around a terminal portion of the panel 14 in FIG. 2 which is located on the lower side of the vehicle, illustrating the terminal portion structure 24. As shown in FIG. 3, the terminal portion of the base material 22 includes an inward flange portion (flange-shaped portion) 26 projecting in the shape of a flange toward the interior side of the vehicle. In other words, the terminal portion 22a of the base material 22 is bent into the shape of a flange projecting toward the interior side of the vehicle. The fold-back terminal portion 16a of the upholstery material 16 is formed by folding back a terminal portion of the upholstery material 16 toward the exterior side of the vehicle (toward the outside of the vehicle, toward the opposite design surface side) so as to tuck in the terminal portion of the upholstery material 16 around the terminal portion 22a of the base material 22 which includes the inward flange portion 26. That is, the terminal portion structure 24 includes the terminal portion 22a of the base material 22 which includes the inward flange portion 26 projecting toward the interior side of the vehicle (the inner side of the vehicle), and the fold-back terminal portion 16a of the upholstery material 16 which is tucked in around the terminal portion 22a. The present embodiment is described with respect to an example in which the terminal portion structure 24 is applied to the terminal portion of the panel 14 which is located on the lower side of the vehicle. However, the terminal portion structure 24 of the present embodiment is also applied in a preferable manner to a terminal portion of the panel 14 which is located on the upper side of the vehicle, a terminal portion of the panel 14 which is located on the lateral side (in the lateral direction) of the vehicle, etc.

In the terminal portion structure 24, the panel 14 has a clearance 28 between a terminal 26a of the inward flange portion 26 and the upholstery material 16. That is, it is ensured that the clearance 28 corresponding to a predetermined interval of, e.g., about 2 mm is present between the terminal (end, edge) 26a of the inward flange portion 26 which is located on the interior side of the vehicle and the inner surface of the upholstery material 16 which is located on the exterior side of the vehicle (the opposite design surface side). In other words, the inward flange portion 26 projects so that the clearance 28 is present between the inward flange portion 26 and the upholstery material 16. The terminal 26a of the inward flange portion 26 is formed by cutting off, e.g., about 2 mm of the tip end of the inward flange portion 26 so as to ensure that the clearance 28 is present between the terminal 26a and the upholstery material 16.

Still another preferred embodiment of the present invention will be described in detail below with reference to the drawings. In the figure used in the following description, those portions common to the embodiments are denoted with the same reference characters and description thereof will be omitted.

Second Embodiment

FIG. 4 is an enlarged sectional view of a region around a terminal portion of a vehicle interior panel 30 (hereinafter simply referred to as the panel 30) which is located on the lower side of a vehicle, illustrating a terminal portion structure 24 of the panel 30 according to another preferred embodiment of the present invention. FIG. 4 corresponds to FIG. 3 in the first embodiment. In the panel 30 of the present embodiment, an upholstery material 16 that forms a surface layer member 32 is made of, e.g., a synthetic resin material having predetermined elasticity, namely such cushioning properties that the upholstery material 16 is elastically deformed when pressed. The upholstery material 16 has multiple elastic projections 34 formed on its surface on the exterior side of the vehicle (the opposite design surface side) so as to project toward a base material 22. That is, the multiple elastic projections 34 projecting toward the base material 22 are formed integrally with the upholstery material 16 so that space is created between the upholstery material 16 and the base material 22. The upholstery material 16 covers the base material 22 such that at least a part of the elastic projections 34 contacts the surface of the base material 22 which is located on the interior side of the vehicle. In the panel 30, the tip ends of the elastic projections 34 projecting from the upholstery material 16 are elastically deformed when pressed against the surface of the base material 22, whereby the cushioning properties are provided. That is, in the panel 30 of the present embodiment, the elastic projections 34 formed integrally with the upholstery material 16 correspond to the cushioning portion.

The multiple elastic projections 34 are preferably formed so as to spread all over the upholstery material 16, and flexural rigidity of each elastic projection 34 against a compressive load is anisotropic about the axis of the elastic projection 34. For example, the direction in which each elastic projection 34 projects from the upholstery material 16 is shifted from the direction perpendicular to the upholstery material 16 (e.g., the direction normal to the opposite design surface of the upholstery material 16). There may be an elastic projection(s) 34 that projects in the direction perpendicular to the upholstery material 16. With this configuration, flexural rigidity of each elastic projection 34 against a compressive load is anisotropic about the axis of the elastic projection 34. Accordingly, for example, when the upholstery material 16 is pressed in a substantially perpendicular direction from the interior side of the vehicle (the design surface side), each elastic projection 34 tends to be flexurally deformed in a specific direction determined by the anisotropy, whereby a soft feel (cushioning properties) is improved. Moreover, since the direction in which each elastic projection 34 is bent (buckled) can be controlled, each elastic projection 34 is elastically deformed in a stable manner (the direction in which each elastic projection 34 is bent etc.). This restrains variation in tactile feel at the time the upholstery material 16 is pressed with a finger or a hand.

The panel 30 includes, as the cushioning portion, the elastic projections 34 projecting from the upholstery material 16 toward the base material 22. However, the panel 30 may include multiple elastic projections projecting from the base material 22 toward the upholstery material 16, and these elastic projections may function as the cushioning portion.

According to the embodiment described above, a terminal portion of the base material 22 includes an inward flange portion 26 projecting toward the interior side of the vehicle, and the upholstery material 16 serving as the upholstery portion includes a fold-back terminal portion 16a that is formed by folding back a terminal portion of the upholstery material 16 toward the exterior side of the vehicle so as to tuck in the terminal portion of the upholstery material 16 around a terminal portion 22a of the base material 22 which includes the inward flange portion 26. The panel 30 has a clearance 28 between the terminal 26a of the inward flange portion 26 and the upholstery material 16. Accordingly, the cushioning material 18 or the elastic projections 34 which serve as the cushioning portion can be prevented in a preferable manner from being crushed by the fold-back terminal portion 16a of the upholstery material 16. This can ensure a soft tactile feel of a terminal portion of a product and can restrain problems such as reduced strength and defective molding due to the difference in thickness. That is, the panels 14, 30 can be provided which achieve an improved tactile feel of a terminal portion of a product while ensuring desired design.

According to the present embodiment, the clearance 28 is present between the inward flange portion 26 and the upholstery material 16. Accordingly, even if the cushioning material 18 is crushed, the inward flange portion 26 is restrained from being pressed against the upholstery material 16. This reduces problems such as the shape of the terminal portion of the inward flange portion 26 showing on the design surface of the upholstery material 16. As a result, desired design of the panels 14, 30 can be ensured.

In the panel 30, the cushioning portion is the elastic projections 34 projecting from the upholstery material 16 toward the base material 22. Accordingly, forming the cushioning portion integrally with the upholstery material 16 can reduce the material cost and can thus achieve cost reduction.

Although the preferred embodiments of the present invention are described in detail above based on the drawings, the present invention is not limited to these embodiments and can be carried out in various modified forms without departing from the spirit and scope of the invention.

REFERENCE SIGNS LIST 14, 30: Vehicle interior panel 16: Upholstery material (Upholstery portion) 16a: Fold-back terminal portion 18: Cushioning material (Cushioning portion) 20, 32: Surface layer member 22: Base material 22a: Terminal portion 26: Inward flange portion 26a: Terminal 28: Clearance 34: Elastic projection (Cushioning portion)

The invention claimed is:

1. A vehicle interior panel comprising:
   a surface layer member including an upholstery portion and a cushioning portion, the surface layer member covering a front surface of a base material such that the upholstery portion faces an interior side of a vehicle;
   the base material including a terminal portion that is opposed to an opposed portion of the upholstery portion in an opposed direction;
   the terminal portion of the base material including an inward flange portion projecting, in the opposed direction, toward the opposed portion of the upholstery portion;
   the inward flange portion having a distalmost end relative to the base material in the opposed direction that is opposed to the opposed portion of the upholstery portion in the opposed direction;
   the upholstery portion including a fold-back terminal portion which is adjacent to the opposed portion and which is folded back toward an exterior side of the vehicle so as to tuck, in the fold-back terminal portion of the upholstery portion, the terminal portion of the base material which includes the inward flange portion; and
   the vehicle interior panel defining a clearance between the distalmost end of the inward flange portion and the opposed portion of the upholstery portion.

2. The vehicle interior panel according to claim 1, wherein the cushioning portion is an elastic projection projecting from the upholstery portion toward the base material.

3. The vehicle interior panel according to claim 1, wherein the opposed portion of the upholstery portion is spaced apart from the distal end of the inward flange portion of the base material in the opposed direction, by a distance that is increased in a direction away from the fold-back terminal portion of the upholstery portion.

* * * * *